May 28, 1946. W. G. DOW ET AL 2,400,921
WELDING METHOD
Filed Sept. 23, 1942

Inventors
William G. Dow,
Harold C. Early &
Henry J. Gomberg.
Blackmore, Spencer & Flint
Attorneys Patented May 28, 1946

2,400,921

UNITED STATES PATENT OFFICE 2,400,921

WELDING METHOD

William G. Dow, Harold C. Early, and Henry J. Gomberg, Ann Arbor, Mich., assignors to General Motors Corporation, Detroit, Mich., a corporation of Delaware Application September 23, 1942, Serial No. 459,370

9 Claims. (Cl. 219—10)

This invention relates to high-frequency heating and more specifically to such heating as will bring a metal above its melting point and cause fusion or welding.

In securing two metallic pieces together by welding, it is of course necessary to apply a certain amount of heat at a crucial point, but it is also advisable to maintain the remainder of the metallic pieces at as near room or ambient temperature as possible. The ideal situation would of course be to apply a sufficient heat to cause melting of the metal exactly at the point to be welded with a satisfactory temperature gradient in the adjacent portions of the pieces to be welded and to maintain the remaining portions of these pieces at room or ambient temperature. It is also advantageous to have current flow so as to produce welding heat at points not necessarily in alignment with the welding electrodes or current-conducting means. High-frequency currents have certain characteristics which make them desirable for obtaining the above. They have of course the characteristic, which applies to all alternating currents, that they tend to follow the path of least impedance. Impedance has of course the two constituents, ohmic resistance and reactance. For any given current path, at sufficiently low frequencies, the reactance is much smaller than the resistance; therefore, the impedance is determined by the resistance. Whereas, at the higher frequencies, the reactance becomes much larger than the resistance and therefore the impedance is determined primarily by the reactance. Therefore, high-frequency currents tend to follow paths of least reactance.

A special manifestation of this tendency to follow paths of least reactance is commonly known as the "skin effect" which makes high-frequency currents be confined to paths very close to the surfaces of wires or other conductors in which they flow, for the reason that this travel close to the surfaces corresponds to paths of less reactance than paths which penetrate more deeply into the metal.

Thus high-frequency currents do not in general flow in the interior of conductors. By using high frequency we can maintain the current, and therefore the heating effect, on the surface, which is where the weld would be made. The higher the frequency the greater the tendency to flow on the surface. The general characteristic of the tendency of high-frequency current to follow the path of least reactance, and the special manifestation called "skin effect," are very useful in our method, and their application will be more fully explained at a later point. The term "high frequency" as used herein refers to such a frequency as will give a low enough penetration in the material being used together with its resistivity to cause a substantial concentration of current and so of heat at the advancing edge of the weld to cause fusion. If the frequency is too low, the current and the heat will be distributed over a region sufficiently far back from the advancing edge to prevent the possibility of localized fusion.

It is an object of our invention to provide a high-frequency welding method.

It is a further object of our invention to provide a welding method in which the heat is concentrated at a definite point adjacent to the junction of the two metal pieces and the remainder of the bodies is maintained in a relatively cool state.

It is a still further object of our invention to provide a welding method in which a comparatively large area of two adjacent metal surfaces may be welded together in a single operation of very short duration.

It is a still further object of our invention to provide a welding method in which the current necessary to weld is substantially independent of the area to be welded.

It is a still further object of our invention to provide a welding method whereby a weld may be accomplished at any desired point in two juxtaposed pieces substantially independent of the location of current-bearing electrodes.

It is a still further object of our invention to provide a welding method whereby the width and length of the area to be welded, of two juxtaposed pieces, can be controlled independently of one another.

It is a still further object of our invention to provide a welding method in which the speed of a substantially continuous weld can be controlled.

It is a still further object of our invention to provide a welding method for substantially large pieces in which the two points of current introduction can be on the same side of the structure of which the pieces form a part.

It is a still further object of our invention to provide a welding method in which the transformer may be small and light and therefore the welding equipment may be portable.

With these and other objects in view, the embodiments of our invention will be best understood by reference to the following specification and claims and the illustrations in the accompanying drawing, in which:

Figure 1:
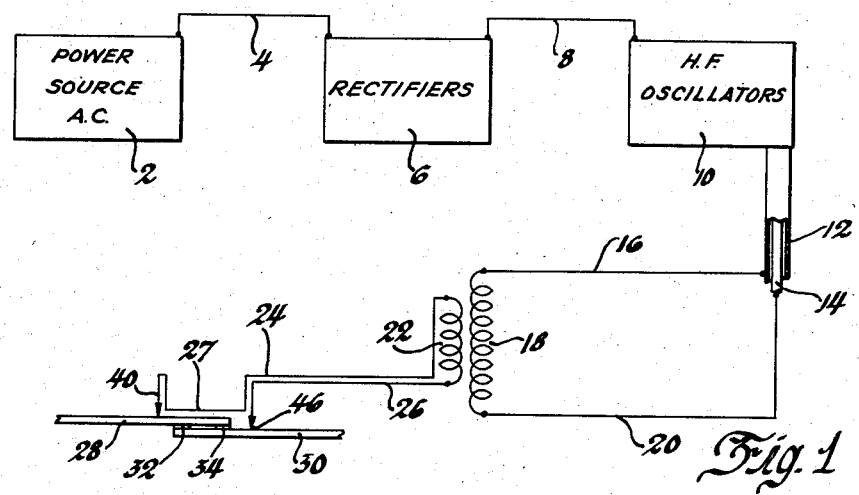
Figure 1 is a schematic diagram of the various parts and electrical connections of a circuit embodying our method.

Referring now more specifically to the drawing, there is shown in Figure 1 a suitable source of alternating-current power 2 which may be the normal 440 volt A. C. supply which is usually found in industrial plants for power purposes. This is connected by line 4 to a bank of rectifiers 6 where the current is rectified to direct current. The output of the rectifiers is conducted by line 8 to high-frequency oscillators 10 for changing this input to high-frequency alternating current.

While only single lines have been shown connecting the various block diagrams, it is of course evident that these represent cables and that any number of individual wires may be included therein.

The high-frequency oscillator bank in this particular instance is designed to generate currents having a frequency of from five thousand to three million cycles, and the output of the oscillator bank is applied to a cable which is here shown as illustrative as coaxial, having two portions: an outer one 12 and an inner one 14. The outer one 12 is connected by line 16 to a transformer primary 18, the opposite side of which is connected by line 20 back to the inner section 14 of the cable. The primary 18 has associated therewith a secondary 22 which is connected by a lead 24 with one electrode for welding and the opposite side is connected by line 26 to a second welding electrode. These electrodes, indicated in the figures as 40 and 46, are brought to bear upon the surfaces of two pieces 28 and 30, respectively, which it is desired to weld together, and the opposite ends of these two pieces are shown in overlapping relation. The conductors 24 and 26 are kept physically very close together, whereby the reactance loop between them is small, and the reactance of the welding circuit is therefore small. It should be noted that in this embodiment the two electrodes 40 and 46 bear on the same side, in the drawing the top side, of the structure made up of the two pieces 28 and 30 which are to be welded together. This permits conductors 24 and 26 to be kept very close together throughout their entire extent, except for the very short portion 27 of conductor 24, this being the portion which extends onward from the close neighborhood of electrode 46 to electrode 40. In this embodiment the transformer secondary 22 may be considered as the source of the high-frequency welding current. The conductors 24 and 26 serve as electrical leads from this source to the electrodes or points of connection 40 and 46 to the members 28 and 30 to be welded together.

There are placed between the two pieces 28 and 30 two longitudinal spacing means 32 and 34 which may be paint or any insulating material provided merely to keep the two from electrical contact, or they may be in whole or in part thin laminations of iron or other metal insulated on at least one face, and by these we define a path having a width chosen as desired and which may be straight or curved as desired between the two overlapped portions for our welding locus.

Figure 2:
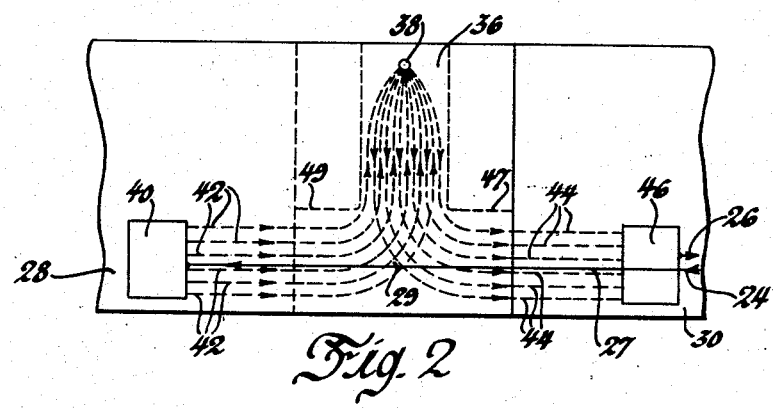
Figure 2 is a top plan view of a lap weld joint showing the path of current.

Referring to Figure 2, it will be seen that this area is defined as the area between the inner dotted lines and is referred to herein as area 36. It should also be noted at this point that, due to the use of these very thin spacer means, which as shown in Figure 1 represents of course an exaggeration, inasmuch as they are only a few thousandths of an inch thick at the most, the contiguous areas facing one another at 36 are not in contact. With our method it is possible to determine the position of the weld in this area 36 at any point desired.

Let it be assumed, therefore, that it is desirable to start the weld at point 38. A slight dent is therefore formed in the upper sheet at this point which brings it into contact with the lower. It should be noted that in this embodiment of our method that portion 27, of the connecting conductor 24, which extends beyond the near neighborhood of electrode 46 to make connection with electrode 40, lies immediately above and close to but insulated from the member 28, and occupies a straight-line position, immediately above a straight line joining electrodes 40 and 46. This portion 27 of the conductor external to the members to be welded serves to determine what path within the members to be welded will have the least reactance.

With the slight contact-making dent 38 formed as indicated, and with electrodes and external conductor 27 located as described, upon application of current the path of current flow within the members 28 and 30 will be as indicated in Figure 2. The current will flow from the transformer along conductor 24 and that portion 27 of 24 which extends from near electrode 46 to connection with electrode 40, into the member 28 at electrode 40, along the dotted-line bent paths 42 to the point 38, concentrate to a very high current density on passing through from member 28 to member 30 at dent 38, follow along the dotted-line bent paths 44 to the electrode 46, there pass into conductor 26 and on to the transformer secondary. It should be noted that conductor portion 27 will in actual practice be a flat conductor of appreciable width, but is shown as a single line in Figure 2 for simplicity. The path of current in the members just described is the path of least impedance corresponding to the particular locations of the spacer means used, the dent, the electrodes and the external conductor portion 27. By changing the position of the external conductor portion 27 the current could in fact be caused to approach the dent 38 from exactly the opposite direction to that shown in the figure, without changing the position of the electrodes 40 and 46. The current used in connection with this embodiment is of an order of high frequency and merely as examples it might be mentioned that various frequencies between thirty thousand and three hundred thousand cycles per second have been used satisfactorily, and undoubtedly frequencies both above and below this range can be used.

As before mentioned, the skin effect exhibited by high-frequency current makes it tend to flow near the surface of any conductor through which it passes, choosing always that surface which gives the entire circuit the smallest reactance loop. Also along a given surface the current will tend to follow or find that path along the surface which has the least impedance. That is the reason why the high-frequency current will take the sharply bent path described heretofore and illustrated in Figure 2, rather than straight-line paths from electrodes 40 to dent 38 and back to 46 again. Only by the current following the path described can the reactance loop be kept to the minimums possible with this embodiment.

As the current is introduced into the top sheet 28 at electrode 40, it will flow along the top surface of the piece 28 until it reaches the region 29, for by flowing along the top surface it maintains the smallest reactance loop with respect to the external conductor portion 27. At region 29 it will drop to the bottom surface of the top sheet and follow the bottom surface from region 29 to dent 38, then flow back from dent 38 to region 29 along the top surface of the bottom sheet 30. In this way the reactance loop between the paths of current flow from region 29 to dent 38 and back again is kept at a minimum. From region 29 the return current flows to electrode 46 along the top surface of the bottom sheet 30, as that maintains the smallest reactance loop between this return current and the incoming path through portion 27 of the external conductor.

Figure 3:
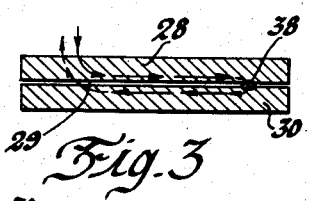
Figures 3, 4 and 5 are sectional views, taken through the lap joint shown in Figure 2, which illustrate the progress of the weld as it advances through continued application of current.

Thus in Figure 3, which shows the beginning of the weld, the current flows along the inner faces of the pieces that are to be welded together. The current seeks these adjacent faces of the two members rather than the outer faces because that will provide the path of least reactance as can be seen from the shape of the inductive loop shown in the drawing, and also because the fields generated by oppositely flowing currents in close proximity tend to decrease the reactance. The result, therefore, is always as small and tight a loop as the currents can follow. Thus in general the currents in sheets 28 and 30 tend first to flow along a surface, and second, to seek that surface and path along the surface where the currents in the opposed sheet or external conductor tend to approach those in the first sheet.

This is shown in some detail in Figure 3, which, as before mentioned, is a sectional view through the lap joint, and illustrates by the spaced arrows the path of current in passing through sheet 28 to flow to the dented portion 30.

Referring to Figure 2, the path of least impedance passes through only the portion of dent 38 on that side nearest region 29, which will be called the front portion of dent 38. Thus the current tends to converge to that near or front portion of dent 38, so that even within the small dent 38 the current density is not uniform but is greatest at the front edge of the dent. The convergence of the dotted-line current paths in Figure 2 illustrates how the current density reaches a very high value at the localized front portion of the dent. Thus by making use of the dent and the principle of least impedance our method causes a high current concentration in each of two dimensions, in that it confines the path to a narrow width from side to side, in Figure 2, and also to the front edge of the dent, thereby making the current density at the front edge of the dent extremely high while preserving low current densities at all other regions within the members to be welded. This concentration of high-frequency current at the front edge or most forward point of dent 38 is sufficient to cause melting and we will therefore have a small pool of molten metal at this point to weld the two metals together. We have now started our crawl or area weld.

Figure 4:
Figure 5:
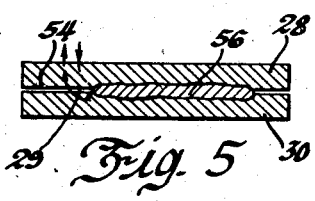

Since it is evident that the path of current illustrated in Figure 2, the path 42—38—44, partakes of the nature of a loop, and since the path of the current seeks to form the smallest reactance loop, this path will tend to advance forward from dent 38 toward region 29 in Figure 2, or to the left in Figure 3, and would eventually form a straight line from electrode 40 through region 29 to electrode 46, if allowed to be energized long enough. Thus, as we form our first pool of molten metal at 38, the current path will tend to pass through the extreme left portion of this small pool at 38, in Figure 3 so that the reactance loop may become smaller. Thus intense heat will be generated at the front portion of this pool, which will cause fusion of the nearby portion of the inner faces of members 28 and 30, so enlarging the pool in the forward direction, that is, in the direction tending to shorten the impedance loop. Meanwhile the rear portion of the pool tends to be cooled by transfer of heat to the remainder of the members 28 and 30, and is permitted to cool because no current is flowing through it. Thus the reactance loop is allowed to become smaller and as the weld progresses we find an elongated section of welded metal such as 50 in Figure 4. It will be seen thereby that the reactance current loop, as shown at 52 in this view, has become less and that the welded or fused portions of the metals have worked to the left; that is, the weld has crawled in that direction. At this time the metal at the extreme right of this nugget 50 will have solidified and only that portion at the extreme left will be in the molten stage. It is, of course, obvious that the longer the current is allowed to remain on, the farther the weld will proceed to the left, and we may reach such a point as that shown in Figure 5 where the welded section has proceeded to a substantial degree across the two pieces and there is only a very small reactance loop left and most of the cross section is welded together as shown at 56.

It has been pointed out that the length of the weld is dependent upon the length of time it is permitted to crawl forward. It is desirable here to point out the factors that control the width or lateral extent of the weld. If the spacer means includes magnetic material and also provides insulation, and if the spacer means stop short of the high-frequency current paths that lead from electrodes 40 and 46 to region 29, as shown by their ends indicated by dashed lines 47 and 49 in Figure 2, the width of the current path from 29 to 38 and back to 29 will be limited chiefly to the region between the spacer means. This behavior is due to the fact that any current filament, extending from 29 toward 38 and back to 29, that lies above and below the magnetic spacer means will set up a strong magnetic flux within the spacer means, thus making such a filament have a high reactance. As an illustration, thin iron laminations insulated on one side have been satisfactorily used for restricting the current path in this way. When the current path is in this way sufficiently restricted and confined magnetically to remain within the defined area 36, the width of the weld is slightly less than that of the defined area, and the molten metal does not actually come in contact with the spacer means. Thus by allowing greater or less width between magnetic spacer means, the width of the weld may be controlled independently of its length.

If the spacer means consists of a non-magnetic insulating material, the width of the current path from region 29 to dent 38 and back to 29 is not necessarily restricted to remain within the boundaries of the defined area 36. In this case, as the weld crawls forward, the pool of molten metal tends to spread out laterally, that is, at right angles to the direction of crawl, as well as forwards. This lateral spread tends to continue until the molten pool reaches the insulating spacer means on both right and left in Figure 2. The spacer means can be made of heat-resistant material such that it retains its insulating property when and after it is reached by the molten metal of the pool. In such a case the further lateral growth of the weld is stopped and its width is restricted to that of the defined area 36. In this way the width of the weld can be controlled independently of its length by the use of non-magnetic spacer means.

Figure 6:
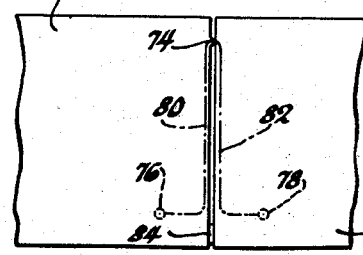
Figure 6 is a top plan view showing the use of our method for end welds.

In Figure 6 there are shown two plates which are to be joined together by welding the edges or butt welding. The method is applied to this form by having two plates 70 and 72 which lie in the same plane and have their adjacent edges in proximity. These edges are slightly spaced apart and at one location a small projection is formed on the edge of one of the plates, let us say on 70 as shown at 74, which presses against the side of the other plate. The electrodes are introduced to the surface of the plates at points 76 and 78 and the current paths in the two pieces are shown at 80 and 82. It will thus be evident that the weld will as before crawl downward in the figure to unite the two plates at their edges. The only prerequisite is that a small layer of insulating material such as shown at 84 must be applied between the two opposite edges to insure that no electrical contact is made at that point, but that the current path must follow that shown at 80 and 82. In this way the same process can be applied to edge or butt welding. If relative motion is provided between the electrodes and sheets, the weld may be continued for as long as desired.

We have thus provided a method of welding two sheets together, the weld extending approximately over an area defined by two insulating strips which in the embodiment shown in Figures 1 and 2 are applied adjacent to the extreme edges. Other embodiments in which the insulating strips are not adjacent to edges may be used. Any portion of the area lying between these two strips may be welded together by our method. This is controlled only by the location of the first point of intimate contact or dent and the position of the electrodes and the external circuit conductor. It is desired to point out that the spacing between the two members to be welded is of course determined by the thickness of the spacing means. When welding any particular material, the speed at which the weld progresses has been found to depend on the frequency of the current used, the spacing between the two members to be welded, and the amount of current used for a weld of given width. The higher the frequency, the faster the weld will crawl; the farther the members to be welded are apart, the more slowly the weld will crawl; the greater the current for given width, the faster the weld will crawl. As an example, rates of crawl between one and two inches per second have been observed during the process of making satisfactory welds.

It is desired to point out that since these electrical currents are of a high order of frequency and therefore flow substantially on the surface, the thickness of the pieces to be welded together is not at all important and actually has very little to do with the success of the weld. It is possible by our method to weld small brackets to a very thick block with no more difficulty than two thin sheets, the shape and size of the parts having very little effect. It is also desired to mention that our welding method will work satisfactorily with aluminum as well as other metals which have heretofore been difficult to weld.

While we have shown in Figures 1, 2, 3, 4 and 5 the two electrodes 40 and 46 as applied to the same side of the sheets, they may of course be applied to opposed sides if desired. The only requisite of the location of electrodes 40 and 46 and the portion 27 of the external circuit is that the reactance path within the defined area must be drawn out into a loop so that it will tend to move back toward a shorter position to cause the crawl of the weld. It will also be seen that the electrodes 40 and 46 are in no way heated and as a matter of fact are made of such a large area that no appreciable heating will occur in their vicinity. It will be obvious that by using our method the heat for the weld is located internally between the sheets at the exact point where heat is desired, and that the outer surfaces of the two pieces being welded are maintained substantially cool.

It is desirable to note at this point that our method of welding permits the use of a light and portable welding device which has heretofore been impractical in welding certain non-ferrous metals, particularly aluminum and aluminum alloys. The reason for this is primarily due to the use of three features in combination, specifically, the ability to locate the two electrodes on the same side of the structure of which the pieces to be welded form a part, in combination with the use of high-frequency current, and in combination with the fact that the instantaneous welding current is relatively small because only a very restricted portion is being heated at each moment.

The ability to make use of a relatively small current permits the transformer current-carrying capacity, therefore its copper content, to be correspondingly small. The ability to place the two electrodes on the same side of the structure to be welded, thus eliminating the electrical "throat" necessary in other electric welding devices, permits the entire reactance loop for the welding circuit to be small, thus requiring a relatively small voltage to be produced in the transformer, which further reduces the bulk and weight necessary in the transformer. It is of course well-known that for given voltage and current output a high frequency transformer may be made smaller and lighter than a low-frequency one. Thus our method combines the three significant advantages of demanding only a relatively small current, a relatively small voltage and a relatively small weight and bulk of transformer for given voltage and current. The transformer, the electrodes, and the connecting conductors are the only parts of the electrical circuit that need to be close to the parts to be welded. It has just been explained why the transformer can be small and light enough to be easily portable. High-frequency power can be brought to the primary of the transformer over flexible cables of considerable length, thus allowing the high-frequency oscillator and associated rectifier to be located at a convenient point at some distance from the structure to be welded.

It should also be mentioned that it is possible in our method to make one weld serve as the starting point for a successive one. For example, if the welding operation in Figure 2 is stopped by turning off the power when the weld has progressed to the condition shown in Figure 4, and the parts allowed to cool to room temperature, a subsequent application of power with no change in physical arrangements will cause the weld to begin again where it stopped and continue until the condition shown in Figure 5. Thus in this case the end of the first weld provides the point of intimate contact to begin the later one and it is not necessary to provide again a dent or point of intimate contact. By moving electrodes periodically, this can be continued indefinitely as a series of short operations, but making a continuous weld.

We claim:

1. In a method of welding a plurality of electrically conductive members together, the steps of applying to the surface of one of the members thin spacer means formed at least partially of insulating material to define a certain area, laying a second member over the surface of the first and on the spacer means, providing electrically conductive means between the contiguous faces of the members within the defined area to give intimate electrical contact between the members at one point and applying high-frequency electrical power to the two members having voltage insufficient to cause arcing between the members.

2. In a method of welding a plurality of electrically conductive members together, the steps of applying, to the surface of one of the members, thin spacer means formed at least partially of insulating material to define a certain area, laying the second member over the surface of the first and on the spacer means, providing a projection on the contiguous face of one of the members of the defined area to give intimate contact between the members at one point, and connecting a source of high-frequency current to each of the members by means of conductors and two points of connection so placed as to cause a bowed or curved current path and the current to flow from one member to the other through the said point of intimate electrical contact.

3. In a method of welding a plurality of electrically conductive members together, the steps of defining a certain area on the surface of each member, supporting the members in such a position that within the defined area their surfaces are very close together but not in electrical contact, providing a projection on the contiguous faces of one of the members to give intimate electrical contact between the members at one point within the defined area, connecting a source of high-frequency current to each of the members by means of conductors and two points of connection so placed as to cause the current to flow from one member to the other through the said point of electrical contact, and placing adjacent to the surface of one or both members and between the two, extending outward from certain boundaries of the defined area, a layer of magnetic material of sufficient extent and permeability to make the impedance of a chosen current path in the members to and from the point of intimate contact less than that of any other path within the defined area.

4. In a method of welding a plurality of electrically conductive members together, the steps of applying to the surface of one of the members thin spacer means formed at least partially of insulating material to define a certain area, laying the second member over the surface of the first and on the spacer means, providing a projection on the contiguous face of one of the members within the defined area to give intimate contact between the members at one point and applying a high frequency power to the two members said power having insufficient voltage to cause arcing between the members, the points of application of current and the point of intimate contact not lying in a straight line.

5. In a method of welding a plurality of electrically conductive members together, the steps of placing the members in juxtaposition over a defined area, providing a point in the area at which a more intimate contact exists between the members, applying high-frequency current to the members by means of conductors and two points of connection so placed as to cause the current to flow from one member to the other through said point of more intimate contact, the said point being so located relative to the two points of connection and the portion of the high-frequency circuit external to the members, as to make the high-frequency circuit as a whole have more reactance than would be the case for some other location within the defined area, said application of current being of such strength and for such a length of time as to form a molten pool at the point of most intimate contact, which pool provides a slightly shorter reactance path for the current and a new molten portion is formed as the current path tends to crawl, by fusion at successive points or along a continuous path, toward a current path that passes from one member to the other within the defined area, which makes the high-frequency circuit as a whole have less reactance than would be the case for other nearby locations within the defined area.

6. In a method of welding a plurality of electrically conductive members together, the steps of applying, to the surface of one of the members, thin spacer means formed at least partially of insulating material to define a certain area, laying the second member over the surface of the first and on the spacer means, providing a projection on the contiguous face of one of the members of the defined area to give intimate contact between the members at one point, applying high-frequency current from a source connected to each of the members by means of conductors and two points of connection so placed as to cause the current to flow from one member to the other through the said point of intimate electrical contact, the said point being so located relative to the two points of connection and the portion of the high-frequency circuit external to the members, as to make the high-frequency circuit as a whole have more impedance than would be the case for some other location within the defined area, said application of current being of such strength and such a length of time as to form a molten pool at the point of most intimate contact, which pool provides a slightly shorter impedance path for the current and a new molten pool is formed as the current tends to crawl, by fusion at successive points or along a continuous path, toward a current path that passes from one member to the other within the defined area, which makes the high-frequency circuit as a whole have less impedance than would be the case for any other nearby location within the defined area.

7. In a method of welding a plurality of electrically conductive members together, the steps of defining a certain area on the surface of each member, supporting the members in such a position that within the defined area their surfaces are very close together but not in electrical contact, providing a projection on the contiguous faces of one of the members to give intimate electrical contact between the members at one point within the defined area, applying high-frequency current from a source connected to each of the members by means of conductors and two points of connection so placed as to cause the current to flow from one member to the other through the said point of intimate electrical contact, the said point being so located relative to the two points of connection and the portion of the high-frequency circuit external to the members, as to make the high-frequency circuit as a whole have more impedance than would be the case for some other location within the defined area, said application of current being of such strength and such a length of time as to form a molten pool at the point of most intimate contact, which pool provides a slightly shorter path for the current and a new molten pool is formed as the current tends to crawl, by fusion at successive points or along a continuous path, toward a current path that passes from one member to the other within the defined area, which makes the high-frequency circuit as a whole have less impedance than would be the case for any other nearby location within the defined area.

8. In a method of welding a plurality of electrically conductive members together, placing the same in juxtaposition, separating the adjacent surfaces by non-conducting means, bringing a small section of one member into intimate contact with the other member and applying one terminal of a high-frequency current having insufficient voltage to cause arcing between the members to each member whereby the current will flow from one member to the other through the small section and heat it to a molten state, said terminal contact points and said point of intimate contact defining a loop whereby the reactance path will tend to shorten and cause the welding point to move toward a location corresponding to the establishment of a current path of least impedance for the entire high-frequency circuit, including the conductors leading to and from the source of high-frequency current.

9. In a method of welding a plurality of electrically conductive members together, the steps of placing the members in juxtaposition over a defined area, providing a point in the area at which more intimate contact exists between the members, connecting a source of high-frequency current having voltage insufficient to cause arcing between the members to each of the members by means of conductors and two fixed points of connection so placed as to cause current to flow from one member to the other through said point of more intimate contact, but concentrate on that side only of this point which is nearest the path of least reactance through the members, the said point being so located relative to the two fixed points of connection and the portion of the high-frequency circuit external to the members, as to make the high-frequency circuit as a whole, including the members and the conductors leading from the points of connection to the source, have more reactance than would be the case for some other location within the defined area.

WILLIAM G. DOW.
HAROLD C. EARLY.
HENRY J. GOMBERG.